(12) United States Patent
Hurin et al.

(10) Patent No.: US 10,738,879 B2
(45) Date of Patent: Aug. 11, 2020

(54) PLANETARY TRANSMISSION HAVING PLANET CARRIER WITH THRUST PLATE CONFIGURED TO AID IN RETAINING PINS TO CARRIER BODY

(71) Applicant: BorgWarner Inc., Auburn Hills, MI (US)

(72) Inventors: Shane E. Hurin, Clover, SC (US); Lee V. Bolton, Seneca, SC (US)

(73) Assignee: BorgWarner Inc., Auburn Hills, MI (US)

( * ) Notice: Subject to any disclaimer, the term of this patent is extended or adjusted under 35 U.S.C. 154(b) by 166 days.

(21) Appl. No.: 16/037,489

(22) Filed: Jul. 17, 2018

(65) Prior Publication Data

US 2020/0025287 A1    Jan. 23, 2020

(51) Int. Cl.
*F16H 57/021* (2012.01)
*F16H 57/08* (2006.01)
*F16H 1/32* (2006.01)

(52) U.S. Cl.
CPC .............. *F16H 57/082* (2013.01); *F16H 1/32* (2013.01); *F16H 57/021* (2013.01); *F16H 2001/325* (2013.01); *F16H 2001/327* (2013.01); *F16H 2057/085* (2013.01)

(58) Field of Classification Search
CPC .... F16H 57/082; F16H 1/32; F16H 2001/327; F16H 2001/325; F16H 2057/085
See application file for complete search history.

(56) References Cited

U.S. PATENT DOCUMENTS

| | | | |
|---|---|---|---|
| 4,756,212 A * | 7/1988 | Fuehrer | F16H 57/0479 475/159 |
| 4,901,601 A * | 2/1990 | Leggat | F16H 57/082 29/893.1 |
| 4,998,909 A | 3/1991 | Fuehrer | |
| 6,023,836 A | 2/2000 | Matsuoka et al. | |
| 8,905,894 B2 | 12/2014 | Koyama et al. | |
| 2006/0154778 A1* | 7/2006 | Sowul | F16H 57/082 475/331 |
| 2010/0151986 A1 | 6/2010 | Burgman et al. | |
| 2015/0354694 A1* | 12/2015 | Degenhart | B23P 15/14 475/331 |

* cited by examiner

*Primary Examiner* — Jeffrey A Shapiro
(74) *Attorney, Agent, or Firm* — Burris Law, PLLC

(57) ABSTRACT

A planetary transmission with a carrier body, a plurality of pins, a retaining ring and a thrust plate. The carrier body defines a plurality of pin apertures, which are disposed concentrically about a central axis, and a ring groove into which the retaining ring is received. Each of the pins has a stepped axial end that defines first and second axial end surfaces that are spaced apart from one another. The pins are received into the pin apertures such that the first axial end surface extends from the carrier body. The thrust plate has a plate body and a plurality of tabs that extend radially outwardly from the plate body. Each of the tabs overlies the second axial end surface of an associated one of the pins such that the thrust plate is disposed along the central axis between the second axial end surfaces and the retaining ring.

15 Claims, 4 Drawing Sheets

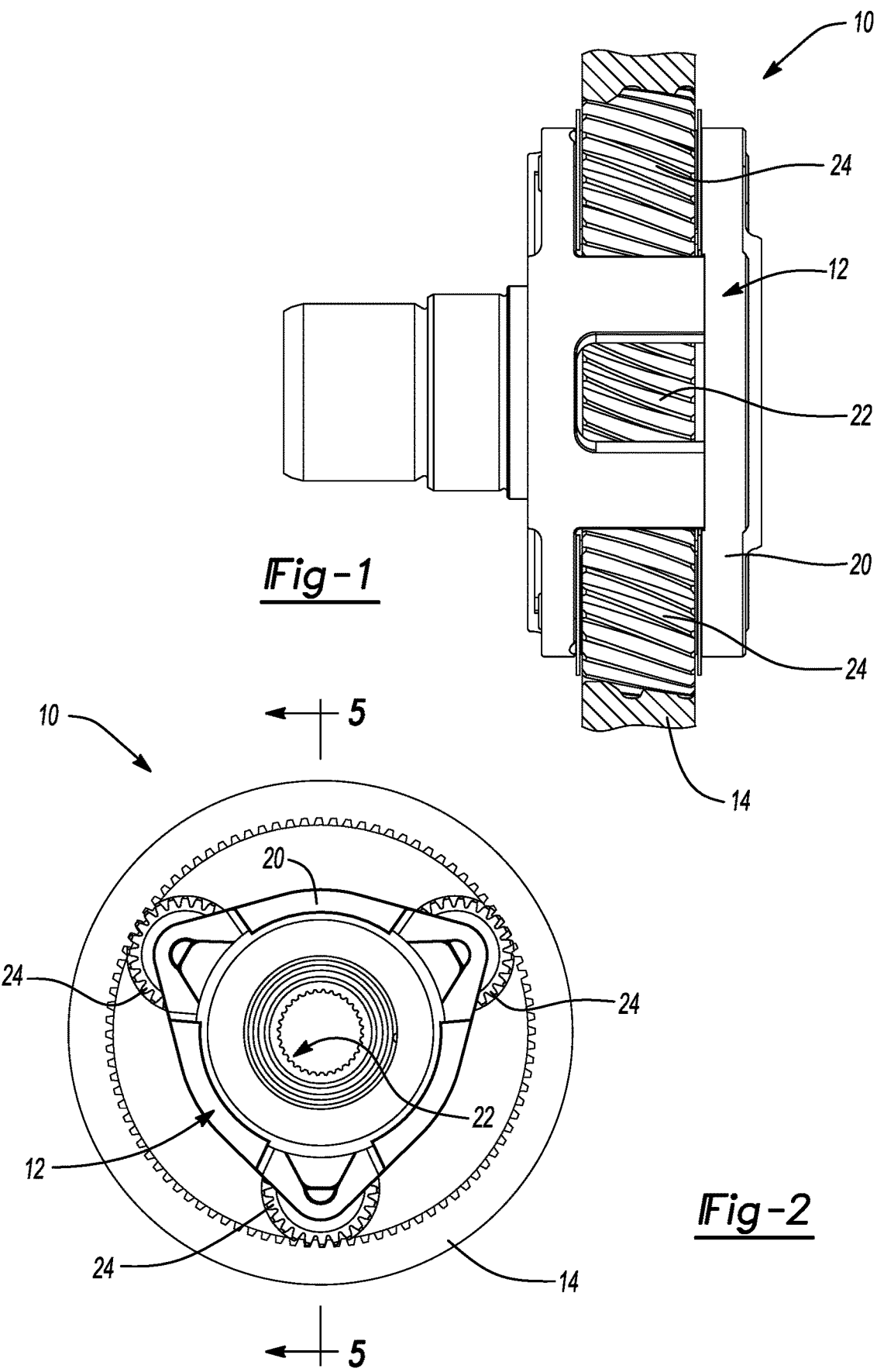

US 10,738,879 B2

PLANETARY TRANSMISSION HAVING PLANET CARRIER WITH THRUST PLATE CONFIGURED TO AID IN RETAINING PINS TO CARRIER BODY

FIELD

The present disclosure relates to a planetary transmission having a planet carrier with a thrust plate that is configured to aid in retaining pins to a carrier body.

BACKGROUND

This section provides background information related to the present disclosure which is not necessarily prior art.

Planetary transmissions typically include a planet carrier that journally supports a plurality of planet gears that can be meshed with a sun gear and/or a ring gear. The planet carrier includes a carrier body and a plurality of pins on which the planet gears are received. The pins can be supported on one or both of their axial ends by the carrier body depending on the magnitude of the rotary load that is transmitted between the planet gears and the pins. Rotation of the pins about their longitudinal axes relative to the carrier body is typically not desirable, but can occur with some planet carrier configurations, especially when the planetary transmission transmits relatively large rotary loads. Various strategies have been conceived to resist relative rotation between the pins and the carrier body, including the use of an interference fit between the pins and the carrier body. While such configurations can be effective, they can frequently be difficult to service in the event that components housed in the carrier body need replacement.

SUMMARY

This section provides a general summary of the disclosure, and is not a comprehensive disclosure of its full scope or all of its features.

In one form, the present disclosure provides a planetary transmission with a carrier body, a plurality of pins, a retaining ring and a thrust plate. The carrier body has first and second plate members that each define a plurality of pin apertures that are disposed concentrically about a central axis. The second plate member defining a retaining ring groove. Each of the pins has a longitudinal pin axis and a stepped axial end that defines first and second axial end surfaces that are spaced apart from one another along the longitudinal pin axis. Each of the pins is received into a respective one of the pin apertures in the first plate member and a respective one of the pin apertures in the second plate member such that the first axial end surface extends from the second plate member on a side of the second plate member opposite the first plate member. The retaining ring is received in the retaining ring groove. The thrust plate has a plate body and a plurality of tabs that extend radially outwardly from the plate body. Each of the tabs overlies the second axial end surface of an associated one of the pins such that the thrust plate is disposed along the central axis between the second axial end surfaces and the retaining ring.

In another form, the present disclosure provides a method for assembling a planetary transmission. The method includes: providing a carrier body that defines a central axis; assembling pins and planet gears to the carrier body, each of the planet gears being disposed about an associated one of the pins, each of the pins having a longitudinal pin axis and a stepped axial end that defines first and second axial end surfaces that are spaced apart from one another along the longitudinal pin axis; inserting a sun gear through an assembly aperture in the carrier body; abutting a thrust plate to the carrier body, the thrust plate having a plate body and a plurality of tabs that extend radially outwardly from the plate body, each of the tabs overlying the second axial end surface of an associated one of the pins; and mounting a retaining ring into a ring groove formed in the carrier body to retain the thrust plate to the carrier body.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a partly sectioned front elevation view of an exemplary planetary transmission constructed in accordance with the teachings of the present disclosure;

FIG. 2 is a rear view of the planetary transmission of FIG. 1;

Corresponding reference numerals indicate corresponding parts throughout the several views of the drawings.

DETAILED DESCRIPTION

Figure 3:
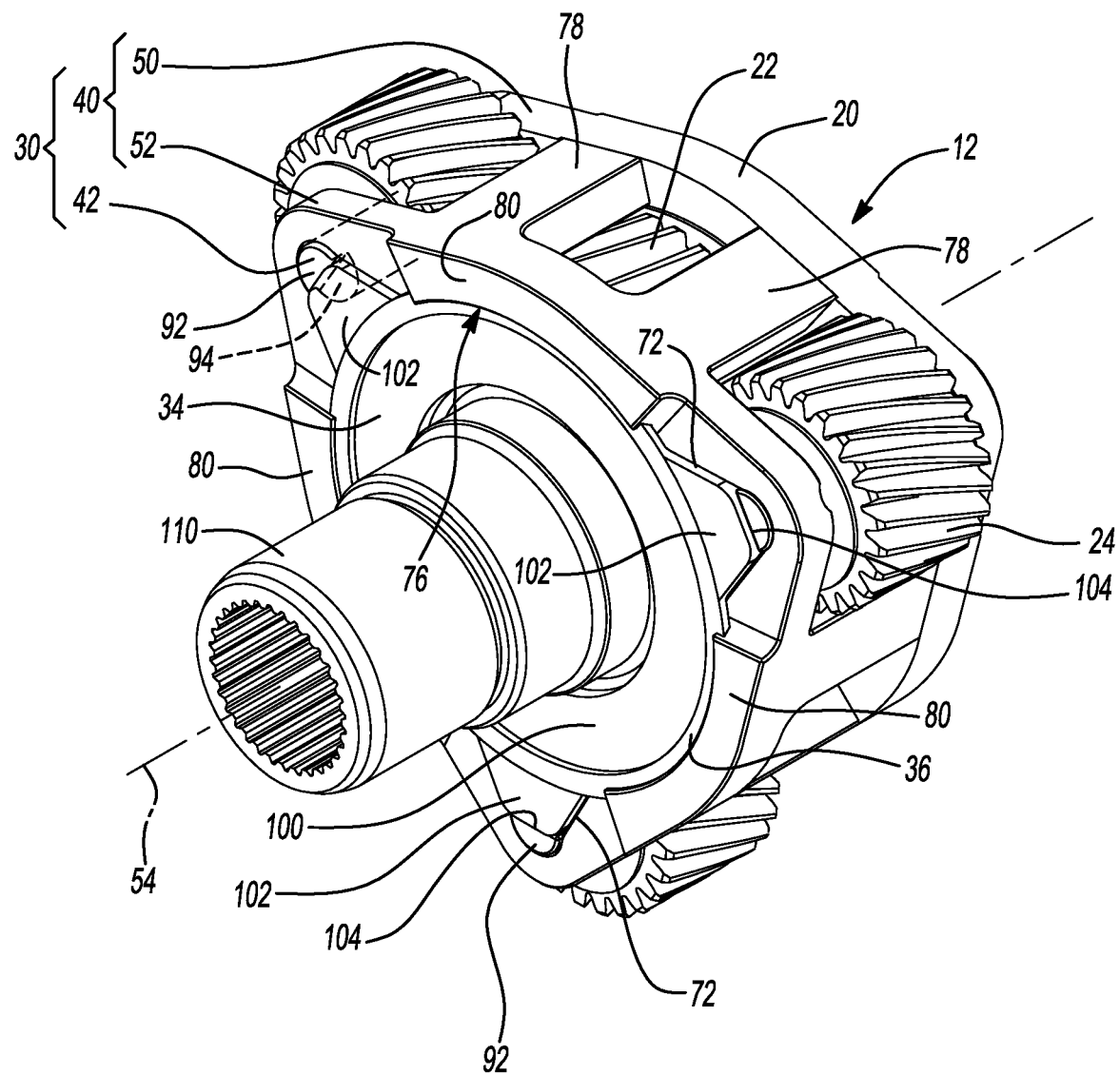
FIG. 3 is a perspective view of a portion of the planetary transmission of FIG. 1 illustrating a planet carrier cartridge in more detail.

With reference to FIGS. 1 through 3 of the drawings, a planetary transmission constructed in accordance with the teachings of the present disclosure is generally indicated by reference numeral 10. The planetary transmission 10 can include a planet carrier cartridge 12 and a ring gear 14. The planet carrier cartridge 12 can have a planet carrier assembly 20, a sun gear 22, and a plurality of planet gears 24. In the example provided, the ring gear 14, the sun gear 22 and the planet gears 24 are formed with helical gear teeth, but it will be appreciated that they could be formed with spur (straight) gear teeth in the alternative.

Figure 4:
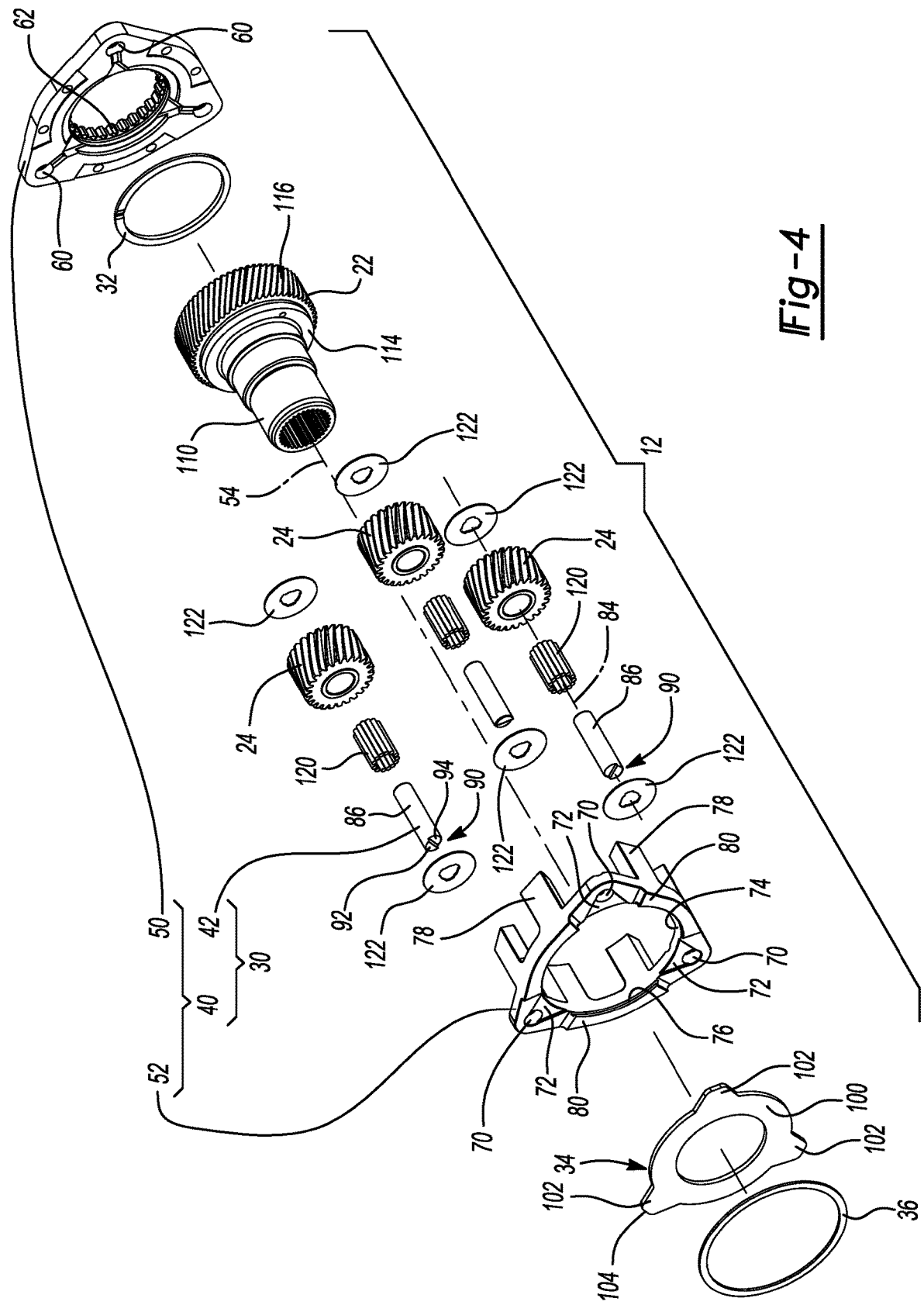
FIG. 4 is an exploded perspective view of the planet carrier cartridge.
Figure 5:
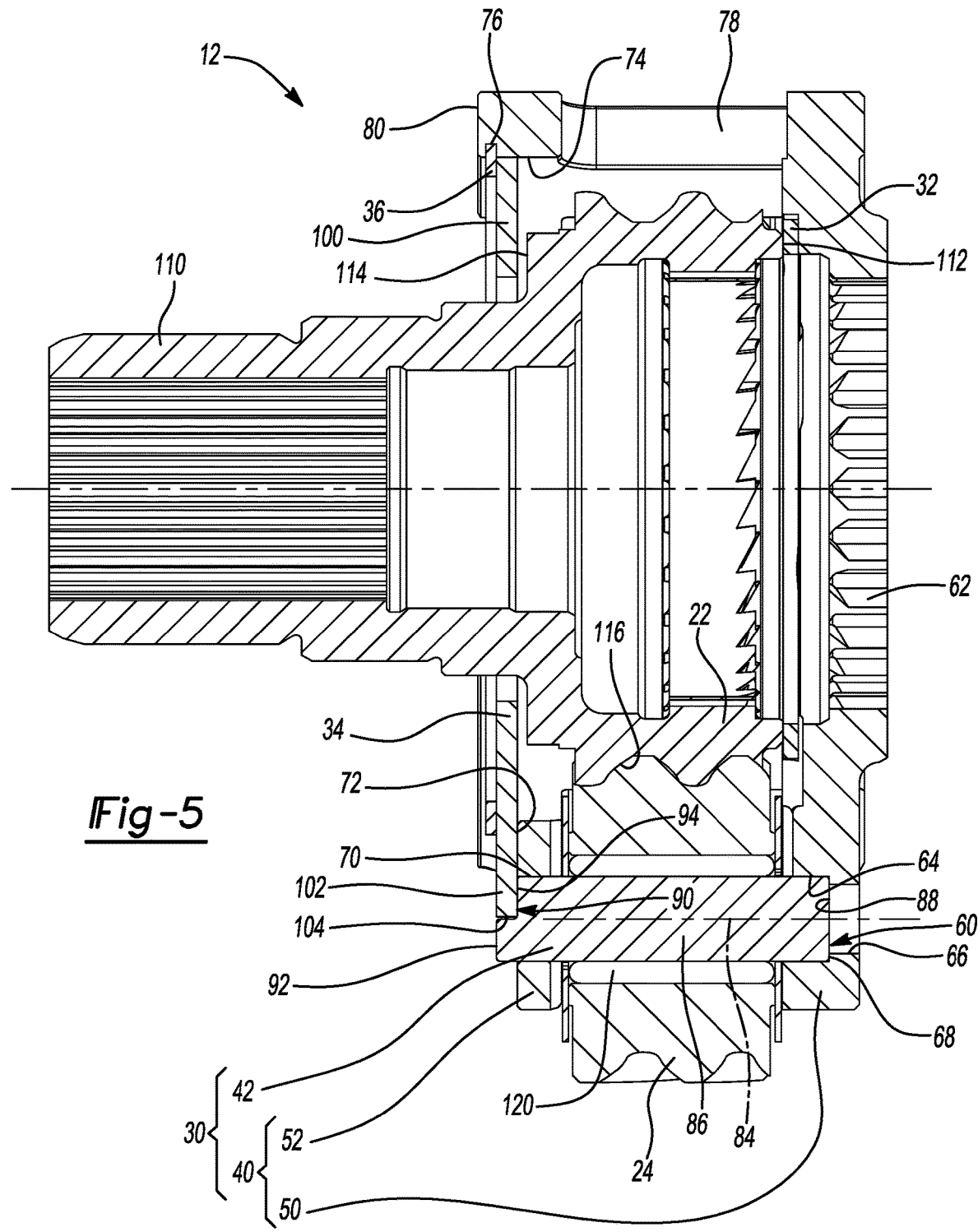
FIG. 5 is a section view taken along the line 5-5 of FIG. 2.

With reference to FIGS. 3 through 5, the planet carrier assembly 20 can include a planet carrier 30, a thrust washer 32, a thrust plate 34 and a retaining ring 36. The planet carrier 30 can include a carrier body 40 and a plurality of pins 42. The carrier body 40 can include a first plate member 50 and a second plate member 52 that is spaced apart from the first plate member 50 along a central axis 54 to receive the planet gears 24 therebetween. In the example shown, the first and second plate members 50 and 52 are discrete components that are assembled to one another. More specifically, the first and second plate members 50 and 52 are formed of compacted powdered metal and are joined by brazing when the first and second plate members 50 and 52 are sintered. Thereafter, the first and second plate members 50 and 52 can be machined as a unit. It will be appreciated, however, that the first and second plate members 50 and 52 could be unitarily and integrally formed.

The first plate member 50 can define a plurality of first pin apertures 60 and an internally toothed aperture 62 that defines a plurality of teeth that are disposed concentrically about the central axis 54. The first pin apertures 60 can be spaced concentrically about the central axis 54 and can have a stepped configuration with a first portion 64 and a second, smaller diameter portion 66. A shoulder 68 can be formed where the first and second portions 64 and 66 intersect one another.

The second plate member 52 can define a plurality of second pin apertures 70, a plurality of tab recesses 72, an assembly aperture 74 and a retaining ring groove 76. A plurality of spacing legs 78 can be coupled to (e.g., unitarily and integrally formed with) one of the first plate member 50 and/or the second plate member 52 and can contact the other one of the first plate member 50 and the second plate member 52 to space the first and second plate members 50 and 52 apart from one another along the central axis 54. In the example provided, the spacing legs 78 are unitarily and integrally formed with the second plate member 52. The second pin apertures 70 can be spaced concentrically about the central axis 54. The tab recesses 72 are formed into an axial end of the second plate member 52 on a side that faces away from the first plate member 50. Each of the tab recesses 72 intersects an associated one of the second pin apertures 70. The assembly aperture 74 is formed through the second plate member 52 and is sized to permit the sun gear 22 to be inserted into the space between the first and second plate members 50 and 52. The retaining ring groove 76 is formed into the second plate member 52 concentrically about the central axis 54. In the example provided, the retaining ring groove 76 is formed in a discontinuous manner by three circumferentially extending rib members 80 and is disposed radially inwardly of the second pin apertures 70.

Each of the pins 42 can extend along a longitudinal pin axis 84 and can have a pin body 86 with a first axial end 88 and a second axial end 90. The second axial end 90 can be stepped so as to have a first axial end surface 92 and a second axial end surface 94 that are spaced apart from one another along the longitudinal pin axis 84. Each of the pins 42 can be received into one of the first pin apertures 60 in the first plate member 50 and one of the second pin apertures 70 in the second plate member 52. In the example provided, the pin bodies 86 are received in a slip-fit manner into the first and second pin apertures 60 and 70 and the first axial ends 88 of the pins 42 are abutted against the shoulders 68 formed by the first pin apertures 60. Configuration in this manner inhibits movement of the pins 42 along the longitudinal pin axes 84 relative to the first plate member 50 in a direction away from the second plate member 52. It will be appreciated, however, that a press-fit or interference fit between the pins 42 and the first pin apertures 60 and/or the second pin apertures 70 could be employed to secure the pins 42 to the first plate member 50 and/or the second plate member 52. The first axial end surfaces 92 of the pins 42 can extend along the central axis 54 past the axial end of the second plate member 52 that faces away from the first plate member 50. The second axial end surfaces 94 of the pins 42 can be disposed along the central axis 54 at a desired location, such as flush or below the portions of the axial end of the second plate member 52 that define the bottom surfaces of the tab recesses 72.

The thrust plate 34 has a plate body 100 and a plurality of tabs 102 that extend radially outwardly from the plate body 100. In the example provided, the plate body 100 has an annular shape and is smaller in diameter than the assembly aperture 74 in the second plate member 52. The tabs 102 are received into the tab recesses 72 in the second plate member 52 and overlie the second axial end surfaces 94 of the pins 42. The tabs 102 and the tab recesses 72 can be shaped in a corresponding manner to limit or inhibit relative rotation between the thrust plate 34 and the carrier body 40. In the example provided, the tabs 102 and tab recesses 72 have a triangular shape. Radially outer edges 104 of the tabs 102 cooperate with the portions of the pins 42 that extend between the first and second axial end surfaces 92 and 94 to inhibit or limit rotation of the pins 42 about the longitudinal pin axes 84 relative to the carrier body 40. The tabs 102 can be formed so as to be offset along the central axis 54 relative to the plate body 100. Configuration in this manner permits the plate body 100 to be received into the assembly aperture 74 while the tabs 102 are received in the tab recesses 72 and overlie the second axial end surfaces 94 on the pins 42.

The retaining ring 36 is placed into the assembly aperture 74 and received in the retaining ring groove 76 in the second plate member 52 and secures the thrust plate 34 to the carrier body 40. The retaining ring 36 abuts the plate body 100 on a side of the thrust plate that faces away from the pins 42. Accordingly, the securing of the thrust plate 34 to the carrier body 40 via the retaining ring 36 also limits or inhibits movement of the pins 42 relative to the carrier body 40 along the central axis 54 in a direction away from the first plate member 50. It will be appreciated that the retaining ring 36 is disposed radially inwardly of the pins 42.

The sun gear 22 is rotatable about the central axis 54 and shown in the example provided as being unitarily and integrally formed with a shaft member 110. The sun gear 22 includes first and second thrust surfaces 112 and 114, respectively, and a plurality of sun gear teeth 116. The thrust washer 32 can be received in the space between the first and second plate members 50 and 52 and can be disposed between the first thrust surface 112 on the sun gear 22 and the first plate member 50. The second thrust surface 114 on the sun gear 22 can be disposed adjacent an associated thrust surface on the plate body 100 on the thrust plate 34. Accordingly, the thrust washer 32 accommodates thrust forces between the sun gear 22 and the carrier body 40 in a first direction along the central axis 54, while the plate body 100 accommodates thrust forces between the sun gear 22 and the carrier body 40 in a second, opposite direction along the central axis 54.

Each of the planet gears 24 is disposed between the first and second plate members 50 and 52 and is rotatably received on an associated one of the pins 42. In the example provided, needle bearings 120 are received between the pins 42 and the planet gears 24 and thrust washers 122 are received on the pins 42 between the first and second plate members 50 and 52 and respective axial ends of the planet gears 24. The planet gears 24 can be meshingly engaged to the sun gear 22 and the ring gear 14 (FIG. 2).

The present disclosure also provides a method for assembling a planetary transmission 10. The method includes: providing a carrier body 40 that defines a central axis 54; assembling pins 42 and planet gears 24 to the carrier body 40, each of the planet gears 24 being disposed about an associated one of the pins 42, each of the pins 42 having a longitudinal pin axis 84 and a stepped axial end 90 that defines first and second axial end surfaces 92 and 94, respectively, that are spaced apart from one another along the longitudinal pin axis 84; inserting a sun gear 22 through an assembly aperture 74 in the carrier body 40; abutting a thrust plate 34 to the carrier body 40, the thrust plate having a plate body 100 and a plurality of tabs 102 that extend radially outwardly from the plate body 100, each of the tabs 102 overlying the second axial end surface 94 of an associated one of the pins 42; and mounting a retaining ring 36 through the assembly aperture 74 and into a retaining ring groove 76 formed in the carrier body 40 to retain the thrust plate 34 to the carrier body 40.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A planetary transmission comprising:
   a carrier body having first and second plate members, each of the first and second plate members defining a plurality of pin apertures that are disposed concentrically about a central axis, the second plate member defining a retaining ring groove;
   a plurality of pins, each of the pins having a longitudinal pin axis and a stepped axial end that defines first and second axial end surfaces that are spaced apart from one another along the longitudinal pin axis, each of the pins being received into a respective one of the pin apertures in the first plate member and a respective one of the pin apertures in the second plate member such that the first axial end surface extends from the second plate member on a side of the second plate member opposite the first plate member;
   a retaining ring received in the retaining ring groove; and
   a thrust plate having a plate body and a plurality of tabs that extend radially outwardly from the plate body, each of the tabs overlying the second axial end surface of an associated one of the pins such that the thrust plate is disposed along the central axis between the second axial end surfaces and the retaining ring.

2. The planetary transmission of claim 1, wherein the second plate member defines a plurality of tab recesses, each of the tabs being received in an associated one of the tab recesses.

3. The planetary transmission of claim 2, wherein the tabs are triangular in shape.

4. The planetary transmission of claim 1, wherein the plate body has an annular shape.

5. The planetary transmission of claim 1, wherein an assembly aperture is formed in the second plate member, the assembly aperture being sized to receive the retaining ring there through, wherein the plate body is smaller than the assembly aperture.

6. The planetary transmission of claim 1, wherein the retaining ring is disposed radially inwardly of the pins.

7. The planetary transmission of claim 1, wherein the first and second plate members are fixedly coupled to one another independently of the pins.

8. The planetary transmission of claim 1, further comprising a plurality of planet gears, each of the planet gears being rotatably disposed on a corresponding one of the pins.

9. The planetary transmission of claim 8, further comprising a plurality of bearings, each of the bearings being received between a respective one of the pins and a respective one of the planet gears.

10. The planetary transmission of claim 8, further comprising a sun gear meshingly engaged to the planet gears.

11. The planetary transmission of claim 10, wherein the plate body is larger in diameter than the sun gear.

12. The planetary transmission of claim 11, wherein sun gear and the thrust plate have associated thrust surfaces and wherein the sun gear is slidable between the first and second plate members so that the thrust surface on the sun gear contacts the thrust surface on the thrust plate.

13. The planetary transmission of claim 1, wherein the first plate member defines a plurality of teeth that are disposed concentrically about the central axis.

14. The planetary transmission of claim 1, wherein each of the pins has a shoulder that is seated axially against the first plate member.

15. The planetary transmission of claim 1, wherein the pins engage the pin apertures in at least one of the first and second plate members in a slip fit manner.

* * * * *